(12) United States Patent
Kreuzer et al.

(10) Patent No.: US 9,038,950 B2
(45) Date of Patent: May 26, 2015

(54) ARRANGEMENT OF AERODYNAMIC AUXILIARY SURFACES FOR AN AIRCRAFT

(75) Inventors: Peter Kreuzer, Bremen (DE); Sven Schaber, Schwanewede (DE); Iris Goldhahn, Bremen (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/588,276

(22) Filed: Aug. 17, 2012

(65) Prior Publication Data

US 2013/0001362 A1 Jan. 3, 2013

Related U.S. Application Data

(63) Continuation of application No. PCT/EP2011/051834, filed on Feb. 8, 2011.

(60) Provisional application No. 61/306,187, filed on Feb. 19, 2010.

(30) Foreign Application Priority Data

Feb. 19, 2010 (DE) .......................... 10 2010 008 623

(51) Int. Cl.
  *B64C 1/38* (2006.01)
  *B64C 23/06* (2006.01)
  *B64C 21/10* (2006.01)

(52) U.S. Cl.
  CPC ................. *B64C 23/06* (2013.01); *B64C 21/10* (2013.01); *Y02T 50/162* (2013.01)

(58) Field of Classification Search
  CPC ............................... Y02T 50/166; B64C 21/10
  USPC .......................... 244/130, 117 A, 199.1, 200.1
  See application file for complete search history.

(56) References Cited

U.S. PATENT DOCUMENTS 4,691,881 A * 9/1987 Gioia .......................... 244/106
4,696,442 A 9/1987 Mazzitelli
(Continued)

FOREIGN PATENT DOCUMENTS

GB 517775 A 2/1940
GB 2355444 A 4/2001
(Continued)

OTHER PUBLICATIONS

Calarese et al, "Afterbody Drag Reduction by Vortex Generators", AIAA Paper, American Institute of Aeronautics and Astronautics, US, vol. 85-0354, Jan. 1, 1985, pp. 1-7, XP009150568, ISSN: 0146-3705.
(Continued)

*Primary Examiner* — Brian M O'Hara
(74) *Attorney, Agent, or Firm* — Lerner, David, Littenberg, Krumholz & Mentlik, LLP

(57) ABSTRACT

An arrangement of aerodynamic auxiliary surfaces is configured for being arranged on the underside of an aircraft and furthermore includes a longitudinal axis and at least one aerodynamic auxiliary surface, wherein the aerodynamic auxiliary surface is laterally offset referred to the longitudinal axis, and wherein the aerodynamic auxiliary surface is configured for generating vortices when it is subjected to an oncoming air flow. This makes it possible to compensate vortices caused by the shape of the aircraft such that the directional stability of the aircraft can be improved and the aerodynamic drag may be reduced.

15 Claims, 8 Drawing Sheets

(56) References Cited

U.S. PATENT DOCUMENTS

| | | | |
|---|---|---|---|
| 4,836,473 A * | 6/1989 | Aulehla et al. | 244/130 |
| 5,069,402 A * | 12/1991 | Wortman | 244/130 |
| 5,288,039 A * | 2/1994 | DeLaurier et al. | 244/219 |
| 2004/0046086 A1 | 3/2004 | Dixon et al. | |
| 2007/0194178 A1 | 8/2007 | Lang | |
| 2008/0142640 A9 * | 6/2008 | Lejeau et al. | 244/213 |
| 2009/0236467 A1 * | 9/2009 | Heminway | 244/17.11 |

FOREIGN PATENT DOCUMENTS

| | | |
|---|---|---|
| WO | 03056190 A1 | 7/2003 |
| WO | 2004022215 A2 | 3/2004 |

OTHER PUBLICATIONS

Chinese Office Action dated May 6, 2014.

* cited by examiner

ARRANGEMENT OF AERODYNAMIC AUXILIARY SURFACES FOR AN AIRCRAFT

CROSS-REFERENCE TO RELATED APPLICATIONS

The present application is a continuation of International Application No. PCT/EP2011/051834, filed Feb. 8, 2011, published in German, which claims priority from U.S. Provisional Patent Application No. 61/306,187 filed on Feb. 19, 2010 and German Patent Application No. 10 2010 008 623.1 filed on Feb. 19, 2010, the disclosures of which are incorporated herein by reference.

TECHNICAL FIELD

The invention relates to an arrangement of aerodynamic auxiliary surfaces for an aircraft, and more particularly to an arrangement of aerodynamic auxiliary surfaces for an aircraft, an aircraft with at least one aerodynamic auxiliary surface, as well as the use of such aerodynamic auxiliary surfaces of an aircraft.

BACKGROUND OF THE INVENTION

Various types of aircraft frequently have an aerodynamically optimized shape in order to lower the fuel consumption and to improve the flying characteristics. Aircraft with a relatively high cruising speed usually have a rather elongate shape, but there also exist airborne vehicles with a shape that is not aerodynamically optimized for all needs despite a relatively high attainable cruising speed. This may now and then be the case with transport aircraft that not only need to fulfill a transport function, but also provide particularly effortless access to the cargo compartment and comprise, e.g., an upswept aft fuselage with a hatch door such that bulky goods, vehicles and the like can be easily introduced into the fuselage of the aircraft. Such aircraft occasionally comprise a landing gear that is arranged laterally of the actual fuselage underneath outwardly directed landing gear fairings. Among experts, the term "sponson" that was originally derived from shipbuilding is also used for such bulged shapes on a fuselage underside.

In transport aircraft with upswept aft fuselage, two pronounced main vortices with relatively high intensity are usually created in-flight. If the aircraft additionally comprises above-described sponsons that protrude into the air flow, additional vortices are created that rotate, for example, in the opposite direction referred to the two aforementioned main vortices and in combination with these main vortices lead to a complex vortex system. A deterioration of the directional stability, in particular, may be the direct consequence thereof and entail an increase in the aerodynamic drag.

U.S. Pat. No. 5,069,402 describes an airfreighter with upswept aft fuselage, in which vortex generators are arranged on an underside of the upswept aft fuselage in a region that is acted upon by the main vortices in order to reduce the aerodynamic drag of the transport aircraft.

BRIEF SUMMARY OF THE INVENTION

An aspect of the present invention provides an arrangement, by means of which the directional stability of an aircraft may be improved. Another aspect of the present invention may be seen in additionally reducing the aerodynamic drag of the aircraft.

The described exemplary embodiments likewise relate to the arrangement of aerodynamic auxiliary surfaces, the use and the aircraft. In other words, characteristics that are described below, for example, with reference to the aerodynamic auxiliary surfaces may also be implemented for the use or in the aircraft and vice versa.

According to an embodiment of the invention, an arrangement of aerodynamic auxiliary surfaces is disclosed that has a longitudinal axis and comprises at least one aerodynamic auxiliary surface that is laterally offset referred to the longitudinal axis. The aerodynamic auxiliary surface is designed for generating vortices when it is subjected to an oncoming air flow. The arrangement is furthermore designed for being arranged on the underside of an aircraft.

In other words, it is proposed to use the arrangement according to an embodiment of the invention for generating vortices that positively influence, for example, main vortices occurring on an aircraft fuselage and potential air vortices that are caused by landing gear fairings or other additions to an aircraft fuselage. As a result, the directional stability may be improved and the aerodynamic drag may be reduced. The term "lateral offset" defines that the aerodynamic auxiliary surface does not coincide with the longitudinal axis of the arrangement according to an embodiment of the invention, but rather is spaced apart therefrom. If the arrangement according to an embodiment of the invention is positioned on the underside of an aircraft, the aerodynamic auxiliary surface may be situated, for example, in a right or in a left half of the aircraft and be spaced apart from a vertical plane extending through the longitudinal axis of the aircraft.

As a result, the aerodynamic properties of an aircraft may be significantly improved in a very simple fashion without general constructive modifications of the aircraft, namely by positioning the arrangement of aerodynamic auxiliary surfaces according to an embodiment of the invention on the underside of the aircraft. Other characteristics, for example, of a transport aircraft that lead to the vortex-generating overall configuration of the transport aircraft may be preserved in an unchanged fashion, wherein a significant improvement of the aerodynamic properties may also be simultaneously realized.

According to an advantageous embodiment, a side of the aerodynamic auxiliary surface that is directed downstream is spaced apart from the longitudinal axis of the arrangement according to an embodiment of the invention by a different distance than the side that is directed upstream. When the aerodynamic auxiliary surface is acted upon by an air flow, for example, during a flight of an aircraft equipped with the arrangement according to an embodiment of the invention, this results in air being deflected away from the longitudinal axis. This in turn can lead to vortices that downstream come in contact with other vortices such as, e.g., main vortices or more complex vortex systems on the underside of an aircraft or with a wake vortex behind the aircraft. If the arrangement according to an embodiment of the invention is suitably designed and positioned, vortices can be compensated and spatially shifted such that not only the directional stability of the aircraft may be increased, but its aerodynamic drag may also be reduced. An angle between the aerodynamic auxiliary surface and the longitudinal axis of the arrangement according to an embodiment of the invention may approximately lie between 5 and 30°.

In an advantageous embodiment, the arrangement according to an embodiment of the invention comprises several aerodynamic auxiliary surfaces in a symmetric arrangement referred to the longitudinal axis of the arrangement in order to prevent additional yawing moments and to thusly avoid required rudder deflections.

In an advantageous embodiment of the invention, the aerodynamic auxiliary surface is realized in such a way that a side of the auxiliary surface that is directed downstream extends farther into the air flow around the arrangement than the side that is directed upstream. In this way, the vortex formation by means of the aerodynamic auxiliary surfaces takes place in a very harmonious fashion because abrupt cross-sectional or profile transitions that may lead to an unsteady and possibly unpredictable vortex formation are avoided.

In a particularly advantageous embodiment of the present invention, the arrangement comprises two, three, four, five or more pairs of aerodynamic auxiliary surfaces that are arranged symmetric to one another and positioned in groups on two opposite sides of the arrangement. Due to the increase in the number of aerodynamic auxiliary surfaces, the length, by which they extend into the air flow in order to produce the desired effect, may be realized relatively short. Since the effect of the aerodynamic force on the individual auxiliary surfaces also decreases when their length is reduced, the required thickness of the aerodynamic auxiliary surfaces may be simultaneously dimensioned smaller and the mounting furthermore only needs to absorb low forces.

In this context, it should be noted that, when using several pairs of aerodynamic auxiliary surfaces, respective groups of adjacent auxiliary surfaces do not necessarily have to be arranged equidistantly. Depending on the type and the design of an aircraft using the arrangement according to an embodiment of the invention, it may also be sensible to increase or decrease the distance of the auxiliary surfaces from one another as the distance from the longitudinal axis of the arrangement increases.

In an advantageous embodiment, the aerodynamic auxiliary surface is essentially realized triangularly. However, this does not necessarily preclude that individual edges or corners of the auxiliary surface may be rounded. This shape can be very easily manufactured and therefore results in low manufacturing and replacement part costs.

In a likewise advantageous embodiment, the aerodynamic auxiliary surface is flat and has a plane shape such that a particularly simple manufacture may be achieved and the vortex formation is adjustable with an angle of attack referred to the longitudinal axis of the air flow or the local flow vector, respectively.

In another advantageous embodiment, the aerodynamic auxiliary surface is realized in a lunulate fashion such that a harmonious flow deflection and therefore a harmonious and particularly well predictable vortex formation may take place. The aerodynamic auxiliary surface may, for example, comprise a leading edge, the local tangent of which is directed parallel to the local flow vector, while the auxiliary surface has a tangent that extends obliquely to the local flow vector on the leading edge.

In a likewise preferred embodiment, the aerodynamic auxiliary surface is twisted, i.e., the farther the aerodynamic auxiliary surface extends into the air flow, the more or less the angles of the local tangents on the leading edge and/or the trailing edge change relative to the local flow vector of the air flow directed at the leading edge. Similar shapes are basically known, for example, from turbine blades of turbojet engines.

According to an advantageous embodiment of the invention, the aerodynamic auxiliary surface has a symmetrical profile.

It is furthermore preferred to manufacture the aerodynamic auxiliary surface of a metallic material in order to lower the direct manufacturing costs.

However, it may also be possible to use any other material fit for use in aviation as long as it is able to withstand the forces, moments, temperature and pressure variations occurring under a conventional load during a flight, wherein one aspect of the material selection may be a low specific density. For example, composite materials in the form of composite fiber materials, elastomers, thermosetting plastics, fiber-metal laminates or the like may be used in this respect.

According to an embodiment of the invention, the material may be realized in such an elastic fashion that the risk of damages is reduced when the underside of the aircraft contacts the ground.

It may also be advantageous to design the aerodynamic auxiliary surface such that its alignment, e.g. its angle relative to the longitudinal axis of the arrangement, is adjustable. This may be realized in the form of a manual adjustment with the aid of a tool, as well as with an actuator. In the latter case, it is practical to adjust the aerodynamic auxiliary surface by means of a control unit in dependence on flight parameters, e.g., such that a greater angle is adjusted at slower flying speeds than at slower flying speeds. The angle may likewise be adjusted in dependence on the angle of attack of the aircraft.

Furthermore, an aircraft with an upswept aircraft fuselage is provided, on the underside of which an arrangement according to an embodiment of the invention with the above-described characteristics is arranged. It is advantageous to mount the arrangement according to an embodiment of the invention on the underside in a position that lies in front of an upsweep of the underside of the aircraft fuselage, i.e., upstream of the upsweep. The advantage of such a positioning can be seen in that the efficiency of the aerodynamic auxiliary surfaces can be significantly increased in comparison with conventional vortex generators because the auxiliary surfaces do not lie directly in the main vortices such that the vortex generation is difficult to predict. In the aircraft according to an embodiment of the invention, the aerodynamic auxiliary surfaces therefore generate vortices that only mix with or influence main vortices forming downstream.

The arrangement according to an embodiment of the invention on the aircraft according to an embodiment of the invention is preferably realized such that the aerodynamic auxiliary surfaces generate vortices that influence the spatial dimension of the main vortices and their position behind the aircraft in such a way that a reduced interference effect on the aircraft is created. Depending on the specific design of the aircraft, the angle of the underside of the aft fuselage and other parameters, this may imply that the vortices generated by the aerodynamic auxiliary surfaces have the same rotating direction as the respective main vortices that follow downstream, but are spaced apart farther from the aircraft in the z-direction. As a result, the dimension of the main vortices in the z-direction and the y-direction may be limited or reduced such that a positive effect on the directional stability of the inventive aircraft is achieved.

The reason for this is that the main vortices of an aircraft according to an embodiment of the invention contribute to an increase in the vortex intensity or vorticity in the region of the aft fuselage, wherein this may result in induced cross wind acting upon the tail unit, particularly with a T-tail configuration, such that the inventive aircraft may be pushed into a sideslip or is generally prone to unsteady yawing. The more intensely the main vortices can be deflected downward in the direction of the z-axis of the aircraft, the more pronounced the vorticity may be and the stronger the effect of the main vortices to cause induced cross wind to act upon the tail unit, wherein the latter results in a stronger effect on the directional stability of the aircraft. The purposeful introduction of vortices that are generated by means of aerodynamic auxiliary surfaces, extend underneath the main vortices in the z-direction and rotate in the same direction as the main vortices may at least partially compensate this effect.

If the aircraft furthermore comprises at least one landing gear fairing that is not integrated into the fuselage in a flush fashion, but rather protrudes from the fuselage on the underside thereof similar to sponsons, it is practical to position the arrangement according to an embodiment of the invention on the underside of the sponsons. In numerical analyses, as well as in wind tunnel tests, it may be observed that vortices generated by means of sponsons have an opposite rotating direction referred to the main vortices. In the aforementioned complex vortex system, this may lead to the main vortices being deflected in the z-direction of the aircraft, i.e., downwardly deflected away from the aircraft according to the invention, due to the effect of the sponson vortices. However, this tends to increase the vorticity in comparison with configurations that do not comprise sponsons such that an inferior directional stability results.

According to an embodiment of the invention, the main vortices created by the aircraft itself, as well as the vortices created by the sponsons, can be effectively influenced in that additional vortices generated by the aerodynamic auxiliary surfaces flow into the vortices of the landing gear fairings in the direct, immediate vicinity and at least partially compensate the latter such that the arrangement of aerodynamic auxiliary surfaces according to an embodiment of the invention should be realized in such a way that at least the vortices created by the sponsons are partially or completely compensated. As a result, the increased vorticity caused by the sponson vortices in the region of the aft fuselage and a tail unit arranged thereon may be reduced such that the directional stability can be increased.

At this point, it should be noted that the deterioration of the directional stability caused by the sponson vortices does not apply to all angles of attack of the aircraft according to an embodiment of the invention. At relatively small angles of attack, at which the underside of the upswept aft fuselage is angled relative to the oncoming air flow, a reverse effect may occur that causes the sponson vortices to partially compensate the main vortices, wherein the aerodynamic auxiliary surfaces are deactivated for such angles of attack, for example, by being adjusted into a neutral position with respect to the flow with the aid of actuators.

In a likewise advantageous embodiment, an additional aerodynamic auxiliary surface is arranged parallel to the longitudinal axis of the aircraft in order to achieve an additional improvement of the directional stability.

As already mentioned above, the aerodynamic auxiliary surfaces make it possible to improve the directional stability and to reduce the aerodynamic drag without requiring additional preparations of the aircraft.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the subject-matter of the invention individually and in arbitrary combination regardless of their composition in the individual claims or their references to other claims. In the figures, identical or similar objects are furthermore identified by the same reference symbols.

FIGS. 4a to 4d show different aerodynamic auxiliary surfaces while FIG. 4e shows an auxiliary surface that can be adjusted by means of an actuator.

DETAILED DESCRIPTION

Figure 1:
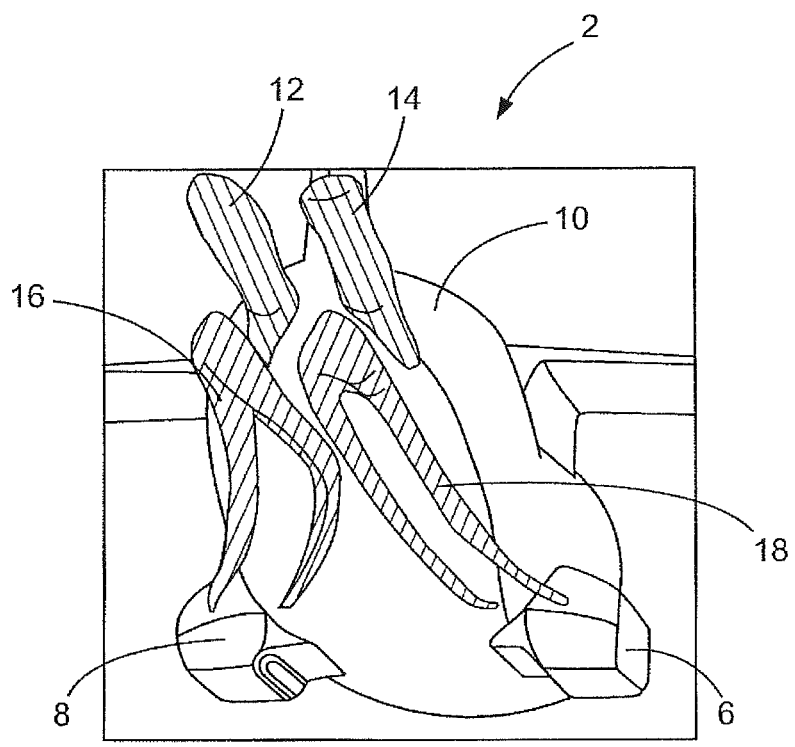
FIG. 1 shows an aircraft with an upswept aft fuselage and landing gear fairings realized separately of the fuselage in the form of a three-dimensional representation.

FIG. 1 shows a three-dimensional representation of an aircraft 2 with two main landing gear fairings 6 and 8 that are realized separately of the aircraft fuselage 4 in the form of sponsons. The peculiarity of this aircraft 2 can be seen in the fact that the aft fuselage 10 is not tapered off in a straight fashion downstream, but rather upswept and therefore partially protrudes into the flow around the aircraft 2.

The upswept aft fuselage 10 creates main vortices 12 and 14 and the landing gear fairings 6 and 8 create ancillary vortices that also referred to as "sponson vortices." The interaction between these main vortices and ancillary vortices 12 to 18 is very complex and may lead to an increase of the aerodynamic drag of the aircraft 2, as well as a deterioration of the directional stability, in comparison with conventional aircraft fuselages that are tapered off in a straight fashion downstream.

The arrangement according to an embodiment of the invention at least partially eliminates this influence on the aerodynamic quality in order to reduce the aerodynamic drag and to improve the directional stability.

Figure 2A:
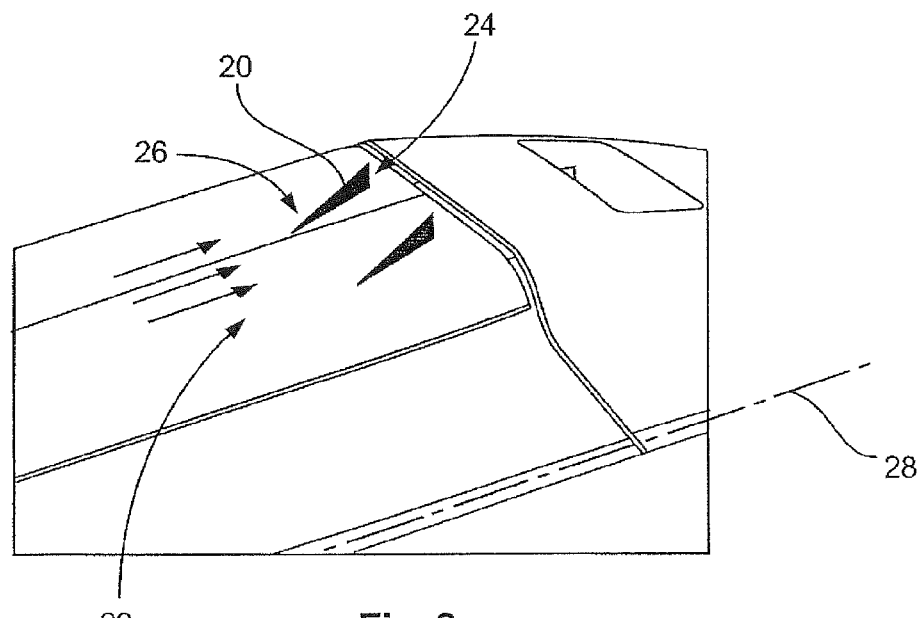
FIGS. 2a and 2b show aerodynamic auxiliary surfaces on the underside of an inventive aircraft.
Figure 2B:
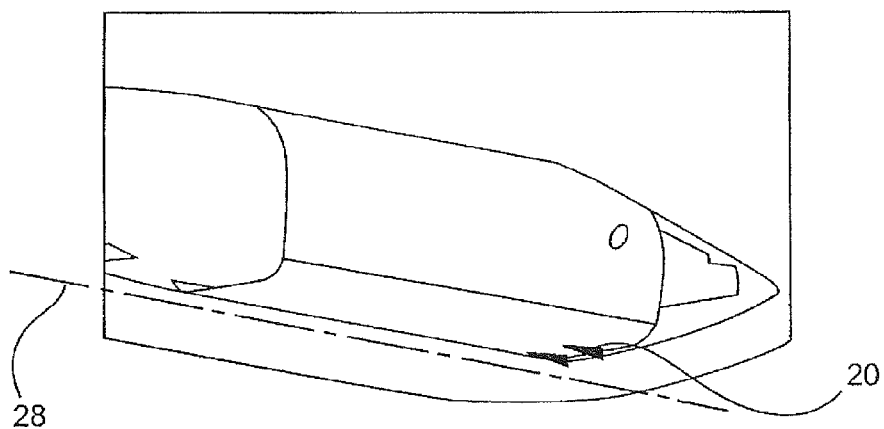

FIGS. 2a and 2b therefore show an arrangement of aerodynamic auxiliary surfaces 20 according to an embodiment of the invention that are arranged on the underside 22 of the aircraft 2. The exemplary aerodynamic auxiliary surfaces 20 shown have a triangular shape, wherein the side 24 that is directed downstream, i.e., toward the tail of the aircraft 2, extends farther into the air flow from the underside 22 of the aircraft 2 than the side 26 that is directed upstream. The direction of the air flow is indicated with arrows "v" that symbolize air flow vectors.

The longitudinal direction of the aerodynamic auxiliary surfaces 20 does not extend parallel to a longitudinal axis 28 of the aircraft 2, but rather obliquely thereto. In this case, the side 24 that is directed downstream, i.e., toward the tail, is spaced apart from a longitudinal plane of section by a different distance than the side 26 that is directed upstream. This means that the air flow is laterally deflected while flowing through the aerodynamic auxiliary surfaces such that a vortex formation results. For example, angles of 5-30° between a line extending parallel to the longitudinal axis 28 of the aircraft and a tangent of a side of the aerodynamic auxiliary surface 20 that is directed downstream may be practical in this respect.

In the illustration shown, two auxiliary surfaces 20 are arranged at a distance from one another and aligned parallel to one another. The vortex formation may be intensified by multiplying the auxiliary surfaces 20 and/or the size of the auxiliary surfaces may be reduced if a desired vortex formation should be maintained such that the requirements with respect to the stability of the individual auxiliary surfaces may be significantly reduced.

Although the aerodynamic auxiliary surfaces 20 are illustrated with a triangular shape, this is not absolutely imperative. The aerodynamic auxiliary surfaces 20 may also be partially curved as described further below with reference to FIGS. 4a to 4c.

The aerodynamic auxiliary surfaces 20 do not necessarily have to be permanently integrated into the underside of the aircraft 2, but it may also be possible to subsequently install these aerodynamic auxiliary surfaces on the underside of the aircraft 2 in the form of additional components.

Figure 3A:
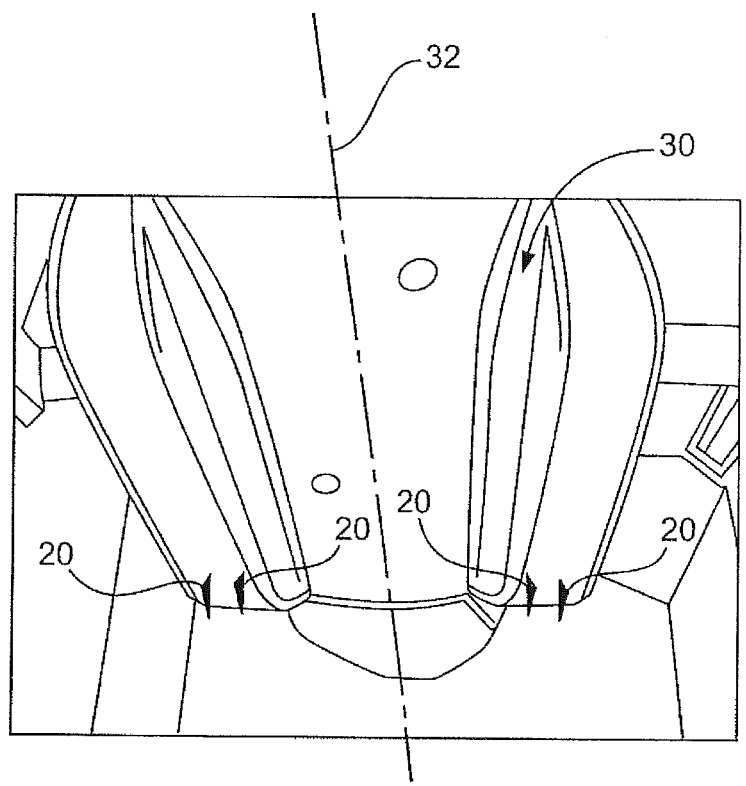
FIGS. 3a to 3i show the underside of a wind tunnel model with aerodynamic auxiliary surfaces on its underside and different embodiments of arrangements of aerodynamic auxiliary surfaces.
Figure 3B:
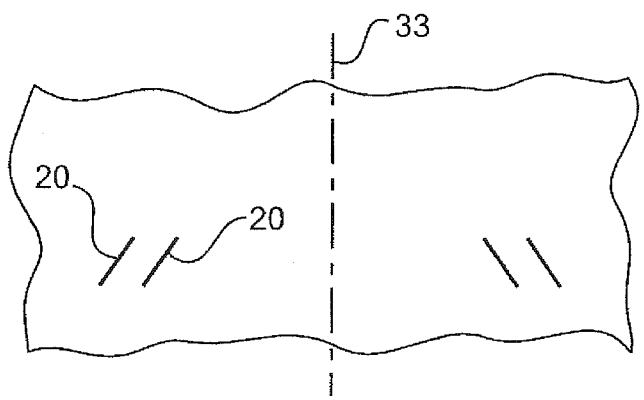
Figure 3C:
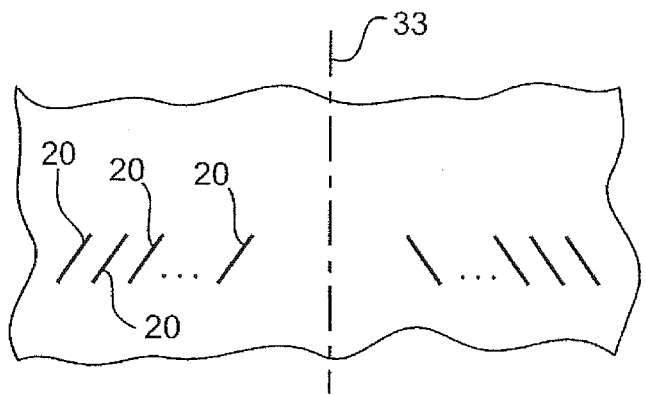
Figure 3D:
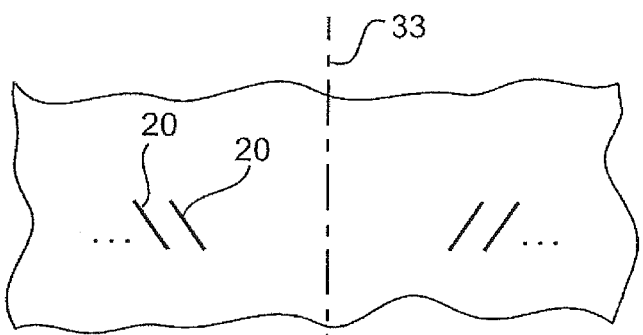
Figure 3E:
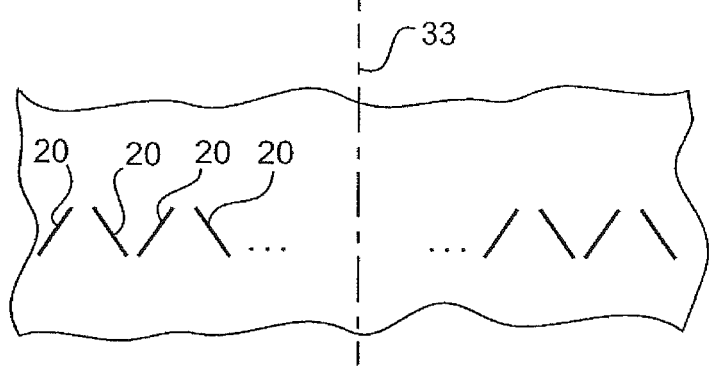
Figure 3F:
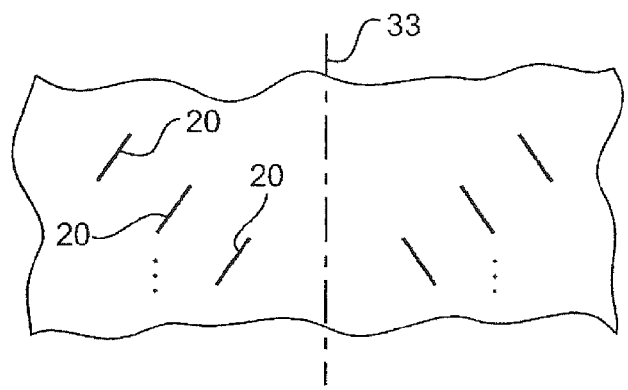
Figure 3G:
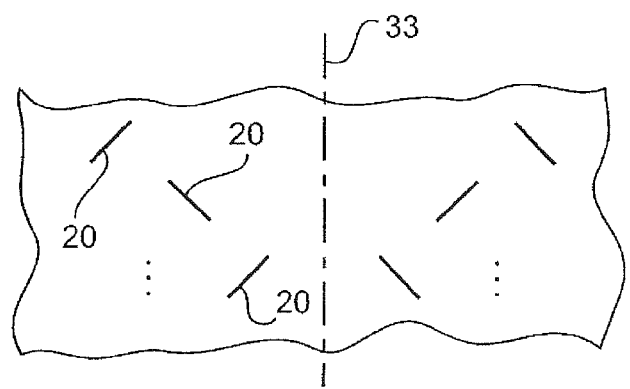
Figure 3H:
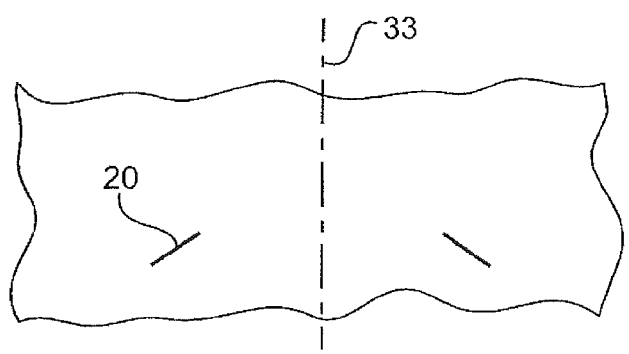
Figure 3I:
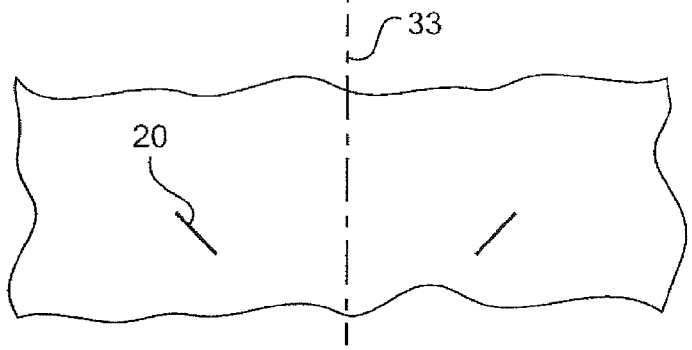

FIG. 3a shows a wind tunnel model 30 that comprises an arrangement according to an embodiment of the invention with two pairs of aerodynamic auxiliary surfaces 20 that are arranged at a distance from one another and symmetrically referred to a longitudinal axis 32 of the wind tunnel model 30. If several aerodynamic auxiliary surfaces 20 are utilized on one side of the underside of an aircraft, it is preferred to align these aerodynamic auxiliary surfaces parallel or non-parallel to one another in order to prevent interference effects between adjacent auxiliary surfaces 20 that may lead to an additional increase of the aerodynamic drag rather than a reduction of the aerodynamic drag of the aircraft.

FIGS. 3b to 3i show several arrangements of aerodynamic auxiliary surfaces 20 in a mere exemplary fashion and without claim of completeness, wherein said aerodynamic auxiliary surfaces are arranged at different angles referred to a longitudinal axis 33 and at different distances from the longitudinal axis 33 and from one another. An adjustment of the angle of the auxiliary surfaces 20 relative to the longitudinal axis 33 makes it possible to influence the rotating direction of the thusly generated vortices. The number, the distances and the general arrangement simultaneously make it possible to define the intensity and the width of the generated voracity field.

Figure 4A:
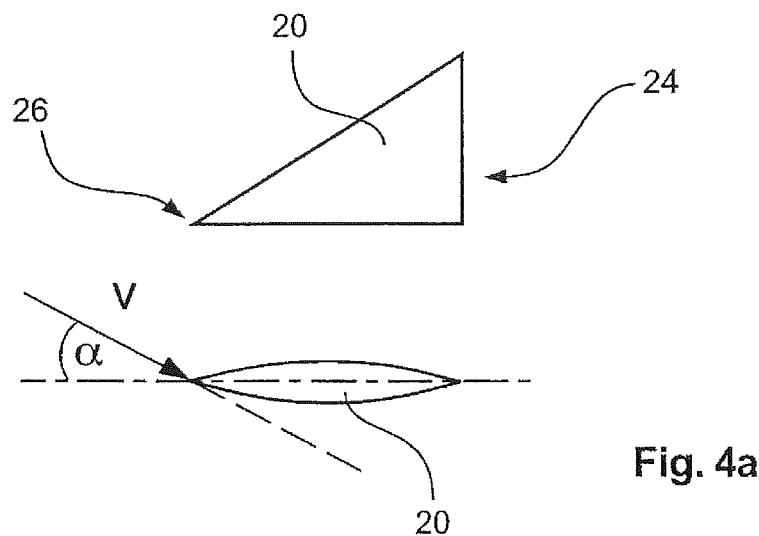

FIG. 4a shows an individual aerodynamic auxiliary surface 20 in the form of a side and top view. The side 26 of the auxiliary surface 20 that is directed upstream may be realized in a pointed or rounded fashion while the profile may be realized symmetrically.

Figure 4B:
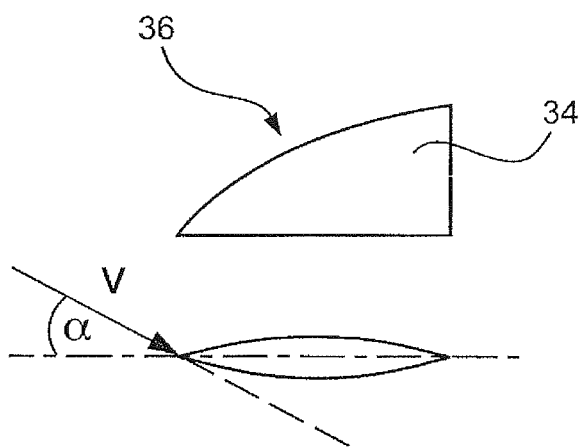

FIG. 4b shows a different illustration of an aerodynamic auxiliary surface 34 with a bent edge 36 that protrudes into the flow around the aircraft 2. The profile of this auxiliary surface 34 may also be symmetrical in order to cause the least inherent aerodynamic losses possible.

Figure 4C:
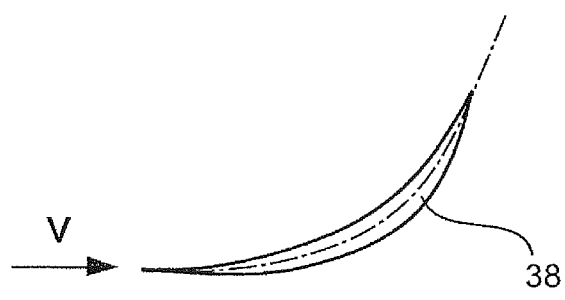

FIG. 4c shows a top view of a profile of an arbitrary aerodynamic auxiliary surface 38 that does not extend obliquely referred to the longitudinal axis of the aircraft, but rather has a curved shape. In this way, a vortex may be generated in a relatively harmonious and effective fashion.

FIG. 4d shows a twisted aerodynamic auxiliary surface 40, in which a surface that faces the fuselage of the aircraft and a surface that faces away from the fuselage of the aircraft from an angle that preferably lies in the range between 5° and 30°.

FIG. 4e shows an aerodynamic auxiliary surface 42 that is supported in an actively rotatable fashion by means of a schematically illustrated actuator 44.

On their leading edge that protrudes into the air flow and/or on the trailing edge, all auxiliary surfaces 20 and 34 shown are angled relative to the oncoming flow vector v by an angle that is greater than 0° and preferably lies in the range between 5° and 30°. In the case of a bent or curved profile 38, the tangent of the trailing edge is angled relative to the oncoming flow vector v by such an angle.

Experiments on wind tunnel models have shown that the arrangement of such aerodynamic auxiliary surfaces 20, 34 on a rear sponson underside may increase the directional stability by +15% in the yaw range around an angle of yaw of 0°, as well as reduce the aerodynamic drag by $2.5 \times 10^{-5}$ (reduction of the $c_w$-value) while cruising.

Figure 5:
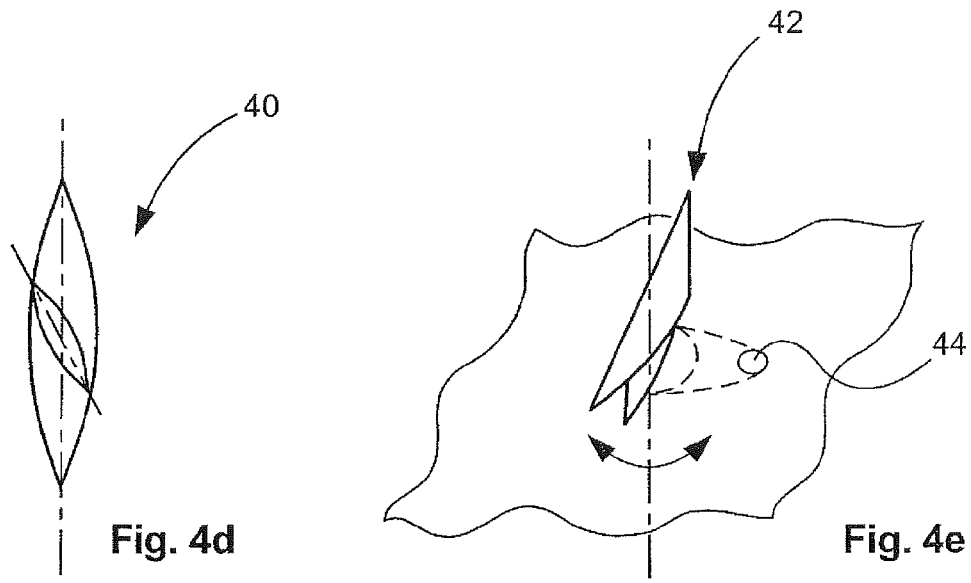
FIG. 5 shows a method for adjusting aerodynamic auxiliary surfaces.
Figure 5:
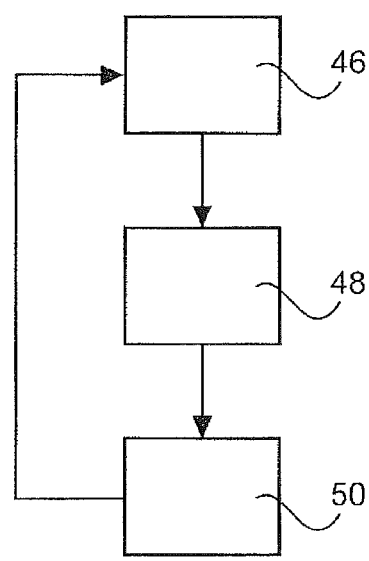

FIG. 5 schematically shows a method, in which the instantaneous flight attitude is determined 46, for example, by means of a processing unit. An adjustment of the aerodynamic auxiliary surface is initiated 48 based on a comparison, e.g., with a dataset with experimentally determined advantageous positions of an aerodynamic auxiliary surface. A subsequent detection 50 of the instantaneous angle of the aerodynamic auxiliary surface may be fed back into the method. This makes it possible to ensure that the aircraft according to the invention and the arrangement according to the invention always influence the vortex system optimally.

Figure 6:
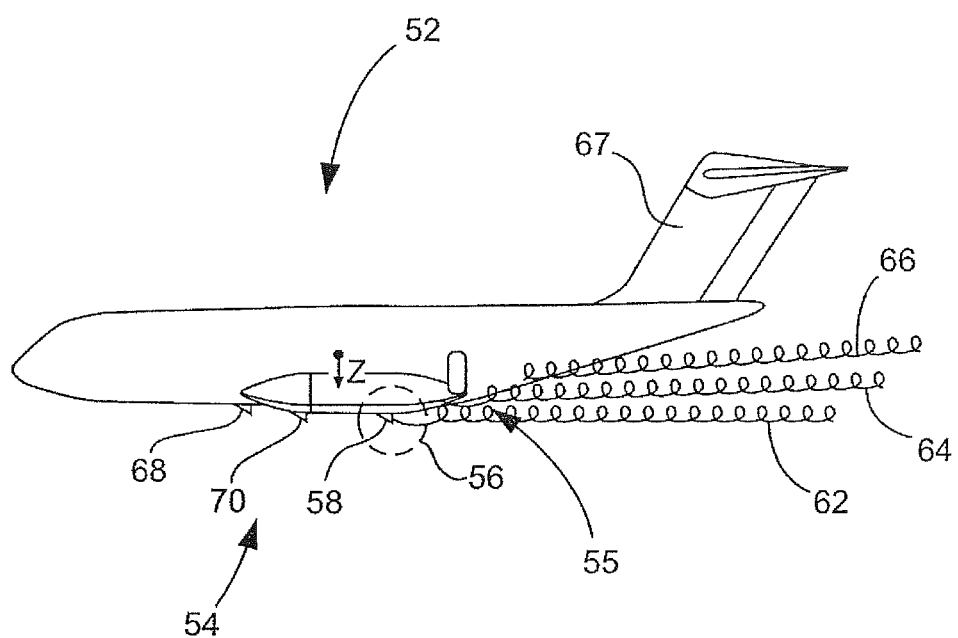
FIG. 6 shows an outline of an aircraft with upswept aft fuselage and at least one arrangement according to an embodiment of the invention arranged thereon.

FIG. 6 ultimately shows an outline of an aircraft 52 according to an embodiment of the invention in the form of a side view, wherein the aircraft 52 comprises one or more arrangements 56 according to the invention that respectively comprise two or more aerodynamic auxiliary surfaces 58 on its underside 54 upstream of an upsweep 55 in the fuselage. Due to the side view, only a single auxiliary surface 58 is visible in this illustration.

For example, the arrangement 56 is arranged in a rear region on two sponsons 60 that are laterally arranged on the aircraft fuselage and generates vortices 62 that extend into a region behind the aircraft 52 in-flight. The sponsons 60 furthermore create sponson vortices 64. The upsweep 55 in the region of the aft fuselage additionally creates main vortices 66 that lead to an increased vorticity in the region of the aft fuselage and therefore a higher induced cross wind that acts upon the tail unit 67 due sponson vortices 64 that rotate in the opposite direction. The sponson vortices 64 may be partially compensated by equipping the aircraft 52 with aerodynamic auxiliary surfaces in the form of one or more arrangements 56 according to an embodiment of the invention in front of the upsweep 55 in the fuselage such that the vorticity of the entire complex vortex system decreases and the directional stability increases.

Alternatively, the aerodynamic auxiliary surfaces may also be arranged on the actual fuselage of the aircraft 52, i.e., not directly on the sponsons 60, but rather on the underside 54 of the aircraft 52 between the sponsons 60. Furthermore, the auxiliary surfaces may also be arranged further upstream as indicated with the exemplary arrangements 68 and 70 according to the invention.

As a supplement, it should be noted that "comprising" does not exclude any other elements or steps, and that "a" or "an" does not exclude a plurality. It should furthermore be noted that characteristics described with reference to one of the above exemplary embodiments can also be used in combination with other characteristics of other above-described exemplary embodiments. Reference symbols in the claims should not be interpreted in a restrictive sense.

REFERENCE SYMBOLS

2 Aircraft
4 Fuselage
6 Landing gear fairing
8 Landing gear fairing

10 Aft fuselage
12 Main vortex
14 Main vortex
16 Sponson vortex
18 Sponson vortex
20 Auxiliary surface
22 Underside
24 Side directed downstream
26 Side directed upstream
28 Longitudinal axis
30 Wind tunnel model
32 Longitudinal axis
34 Auxiliary surface
36 Edge
38 Auxiliary surface
40 Auxiliary surface
42 Auxiliary surface
44 Actuator
46 Determining
48 Adjusting
50 Detecting
52 Fuselage
54 Underside
55 Fuselage upsweep
56 Arrangement
58 Auxiliary surface
60 Sponson
62 Vortex
64 Sponson vortex
66 Main vortex
67 Tail unit
68 Arrangement
70 Arrangement

The invention claimed is:

1. An aircraft comprising:
a fuselage comprising a fuselage upsweep at a rear of the aircraft;
at least one outwardly directed landing gear fairing in form of a sponson on the fuselage; and
at least one arrangement positioned on an underside of the at least one landing gear fairing upstream of the fuselage upsweep, the arrangement having a longitudinal axis and comprising:
a plurality of vortex generators arranged between a first edge and a second edge of the underside, said vortex generators being laterally offset relative to the longitudinal axis, and wherein said plurality of vortex generators is configured for generating vortices when said plurality of vortex generators is subjected to an oncoming air flow.

2. The aircraft of claim 1, wherein a first side of each of said plurality of vortex generators directed downstream is spaced apart from the longitudinal axis of the arrangement by a different distance than a second side directed upstream.

3. The aircraft of claim 1, wherein the plurality of vortex generators is arranged in a symmetric arrangement relative to the longitudinal axis of the arrangement.

4. The aircraft of claim 1, wherein said plurality of vortex generators are configured such that a first side of the vortex generators directed downstream extends farther into the air flow around the arrangement than a second side directed upstream.

5. The aircraft of claim 1, comprising a plurality of pairs of vortex generators arranged between a first edge and a second edge of the underside, the vortex generators of each of the plurality of the pairs being arranged symmetric to one another and positioned in groups on opposite sides of the arrangement.

6. The aircraft of claim 1, wherein each of said plurality of vortex generators has a shape selected from a group of shapes, with the group consisting of:
triangular shape;
lunulate shape;
rectangle;
square; and
segment of a circle.

7. The aircraft of claim 1, wherein at least one of said plurality of vortex generators is flat and has a plane shape.

8. The aircraft of claim 1, wherein at least one of said plurality of vortex generators is twisted.

9. The aircraft of claim 1, wherein at least one of said plurality of vortex generators has a symmetrical profile.

10. The aircraft of claim 1, wherein at least one of said plurality of vortex generators is manufactured of a material selected from a group of materials, with the group consisting of:
metallic material;
composite fiber material;
fiber
metal laminates;
elastomer; and
thermosetting plastic.

11. The aircraft of claim 1, wherein vortices generated by said at least one vortex generators positively influence main vortices occurring on the aircraft.

12. The aircraft of claim 1, wherein each of the plurality of vortex generators is arranged obliquely relative to the longitudinal axis of the arrangement.

13. The aircraft of claim 1, wherein each of the plurality of vortex generators is arranged parallel to an adjacent one of the plurality of vortex generators.

14. The aircraft of claim 1, wherein each of the plurality of vortex generators is arranged obliquely relative to an adjacent one of the plurality of vortex generators.

15. The aircraft of claim 1, wherein an angle of at least one of the plurality of vortex generators relative to the longitudinal axis is adjustable.

* * * * *